(12) United States Patent
Cierullies et al.

(10) Patent No.: US 8,058,635 B2
(45) Date of Patent: Nov. 15, 2011

(54) APPARATUS AND METHOD FOR THE CONTINUOUS OPTICAL DETERMINATION OF THE FILL LEVEL OF LIQUIDS IN LIQUID TANKS OF VEHICLES OR AIRPLANES

(75) Inventors: Sven Cierullies, Hamburg (DE); Ingo Bebermeier, Wedel (DE)

(73) Assignee: M.U.T. Aviation-Technology GmbH, Hamburg (DE)

( * ) Notice: Subject to any disclaimer, the term of this patent is extended or adjusted under 35 U.S.C. 154(b) by 366 days.

(21) Appl. No.: 12/235,314

(22) Filed: Sep. 22, 2008

(65) Prior Publication Data
US 2009/0084995 A1 Apr. 2, 2009

Related U.S. Application Data

(63) Continuation of application No. PCT/EP2007/002600, filed on Mar. 23, 2007.

(30) Foreign Application Priority Data

Mar. 23, 2006 (DE) .......................... 10 2006 014 277

(51) Int. Cl.
*G01F 23/292* (2006.01)
(52) U.S. Cl. ........................ 250/573; 250/577; 73/290 R
(58) Field of Classification Search .......... 250/573–577, 250/900, 904; 73/290 R, 293
See application file for complete search history.

(56) References Cited

U.S. PATENT DOCUMENTS

| 3,817,625 A | 6/1974 | Jordan |
| 4,754,009 A | 6/1988 | Squire |
| 5,073,720 A | 12/1991 | Brown |
| 2001/0022342 A1 | 9/2001 | Wirthlin |
| 2003/0107738 A1 | 6/2003 | Curtis |
| 2004/0246501 A1 | 12/2004 | Curtis |

FOREIGN PATENT DOCUMENTS

CH 432866 9/1967

(Continued)

OTHER PUBLICATIONS

"International Application PCT/EP2007/002600, International Search Report mailed Oct. 9, 2007", 6 pgs.

(Continued)

*Primary Examiner* — Kevin Pyo
(74) *Attorney, Agent, or Firm* — Schwegman, Lundberg & Woessner, P.A.

(57) ABSTRACT

The invention relates to a device and a method for the continuous optical determination of the fill level of liquids in a liquid tank of a vehicle or airplane which have a refractive index of at least 1.33 at room temperature and at a wavelength of 589 nm. The device has an elongate measurement channel (3) which can be arranged on or in a liquid tank. A light emitting means (8, 8') is arranged such that light (13, 14) emitted by the light emitting means (8, 8') is introduced into the measurement channel (3). A detector arrangement (12, 8') is arranged such that light (10) emitted into the measurement channel (3) by the light emitting means (8, 8') is incident on the detector arrangement (12, 8'). The wall (15) which defines the measurement channel (3) is designed such that the reflection coefficient for light of the predetermined wavelength or from the predetermined wavelength range is at least 70%, at least for an angle of incidence up to a predetermined limit angle.

28 Claims, 2 Drawing Sheets

FOREIGN PATENT DOCUMENTS

Figure 1:
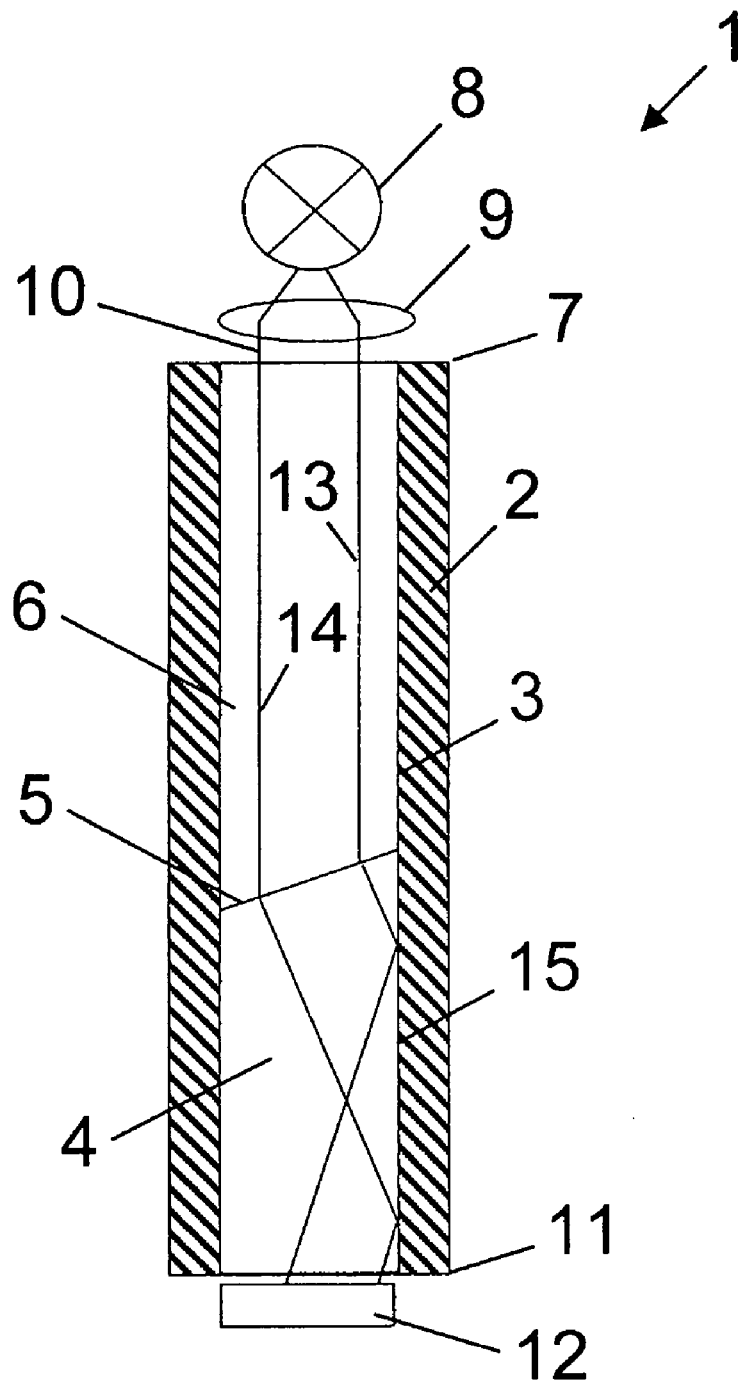

| | | |
|---|---|---|
| DE | 03117477 A1 | 11/1982 |
| DE | 69225331 T2 | 6/1993 |
| DE | 19542439 C1 | 4/1997 |
| DE | 196830 | 3/1998 |
| DE | 10063050 A1 | 6/2002 |
| DE | 69917253 T2 | 5/2005 |
| DE | 102006014277 A1 | 9/2007 |
| EP | 0303221 B1 | 6/1992 |
| FR | 2653555 A1 * | 4/1991 |
| GB | 2240624 A | 8/1991 |
| JP | 1126756 A * | 9/1999 |
| WO | WO-9926044 A1 | 5/1999 |
| WO | WO-2007107379 A2 | 9/2007 |
| WO | WO-2007107379 A3 | 9/2007 |

OTHER PUBLICATIONS

Yakymyshyn, C P, et al., "Differential Absorption Fiber-Optic Liquid Level Sensor", Journal of Lightwave Technology, LT-5(7), (Jul. 1987), 941-946.

* cited by examiner

APPARATUS AND METHOD FOR THE CONTINUOUS OPTICAL DETERMINATION OF THE FILL LEVEL OF LIQUIDS IN LIQUID TANKS OF VEHICLES OR AIRPLANES

RELATED APPLICATIONS

This application is a continuation filing under 35 U.S.C. 111(a) of PCT/EP2007/002600, filed Mar. 23, 2007 and published as WO 2007/107379 A2, on Sep. 27, 2007, which claimed priority under 35 U.S.C. 119 to German Patent Application Serial No. 10 2006 014 277.2, filed Mar. 23, 2006; which applications and publication are incorporated herein by reference and made a part.

The present subject matter relates to a device for the continuous optical determination of the fill level of liquids in liquid tanks or liquid storage containers of vehicles or airplanes and in particular for the continuous optical determination of the fill level of liquid fuel in a fuel tank or fuel storage container of a vehicle or airplane.

In numerous technical applications there exists the need to continuously measure the fill level of liquids. This possibility is of great importance in particular in the field of fill level measurement of liquid fuels in fuel tanks of airplanes and vehicles, such as, for example, cars, trucks or tanks. In these applications an estimation with regard to the remaining range of the airplane or vehicle is only possible by a continuous or stepless knowledge of the current fuel reserve. In the field of vehicles and airplanes there exists moreover the need to determine the fill level of further liquids, such as, for example, water.

Due to this great importance a plurality of different systems for measuring the fill level of liquids and in particular of water as well as of liquid fuels, such as, for example, jet fuel, diesel or gasoline, have been developed. One group of these systems is based on optical methods. Because electromagnetic radiation can be supplied to and guided away from the actual location of measurement via fiber-optics or optical waveguides, systems based on optical methods are of particular advantage in applications comprising explosion-hazardous areas. The measurement systems of this group have in common that electromagnetic radiation is guided into or generated in a liquid tank in such a manner that the electromagnetic radiation passes through the liquid in a direction substantially perpendicular to the surface of the liquid. Then, the fill level can be determined on the basis of the observation of the influence that the liquid has on the propagation or the characteristics of the electromagnetic radiation.

It is for example known to utilize the dependence of the propagation velocity of electromagnetic radiation on the refractive index of the propagation medium in order to determine via propagation time measurements the length of the path of a light pulse in a liquid. Such methods utilize that the propagation velocity of the electromagnetic radiation is greater in air than in the liquid. Further, it is also known to utilize the wavelength dependence of the absorption coefficient of liquids with respect to electromagnetic radiation. One such method, that is referred to as differential absorption, and a system for carrying out this method are described in the article "Differential Absorption Fiber-Optic Liquid Level Sensor", C. P. Yakymyshyn and C. R. Pollock, Journal of Lightwave Technology, Volume LT-5, No. 7, July 1987, 941. In this method light of two or more different wavelengths and with known intensities of incidence are passed through the liquid, and for each wavelength the intensity is measured after passing through the liquid. Due to the absorption coefficients being different and known for the individual wavelengths, it is possible to calculate from the ratio of the measured intensities the length of the light path in the liquid, which light path depends on the fill level.

In all of these optical measurement methods measurement light beams traverse the interface between the liquid and the gaseous atmosphere present over the free liquid surface. This applies both to arrangements, in which the electromagnetic radiation is directed onto the liquid surface from above, i.e. from the gas side, and enters the liquid from the gaseous atmosphere, and to arrangements in which the electromagnetic radiation enters the liquid through a window, that is for example provided in the bottom wall of the liquid tank, from below and passes through the free liquid surface out of the liquid over into gaseous atmosphere. For this reason it has to be taking into consideration that, with the exception of the special case of perpendicular incidence, the electromagnetic radiation is refracted and deflected at the interface. However, this special case will generally not be present in the case of liquid tanks, such as, for example, fuel tanks, of vehicles and airplanes, because in operation vehicles and airplanes often do not assume a horizontal position and, therefore, the inclination of the liquid surface with respect to the predetermined optical path is regularly subject to great variations. In case of a deflection by refraction that is too great and the use of a single light beam or a narrowly collimated pencil of light rays of small aperture angle, the light will, however, no longer be incident onto the detector used for the intensity measurement or for the detection of the light. Therefore, in these applications in the case of narrowly collimated pencils of light rays the problem occurs that in a disadvantageous manner the continuous measurement of the fill level is only possible in a relatively small range of angles of inclination. In order to solve this problem a pencil of light rays with a relatively great aperture angle is regularly utilized. Although it is possible in this manner to guarantee that even at greater angles of inclination a part of the light is still incident onto the detector, this approach has, however, in turn the disadvantage that the expansion of the pencil of light rays results in a great loss of reception intensity, which loss increases quadratically with the measurement distance. This fact is problematic in particular in case of large liquid storage containers, such as, for example, tanks of airplanes or tanks.

Various embodiments provide a simply and flexibly constructed device for the continuous determination of the fill level of a liquid in a liquid tank of a vehicle or airplane, and in particular of liquid fuel in a fuel tank of a vehicle or airplane, in such a manner that the fill level measurement is possible with high accuracy in a greater range of inclination angles than in known systems and that the mentioned disadvantages are thus removed.

Disclosed herein is a device for the continuous optical determination of the fill level of liquids, having at room temperature and a wavelength of 589 nm a refractive index of at least 1.33, in a liquid tank of a vehicle or airplane comprises an elongate measurement channel, that can be disposed on or in a liquid tank in such a manner that liquid located in the liquid tank can enter the measurement channel and form a liquid column in the measurement channel, the dimension of which liquid column in the longitudinal direction of the measurement channel depends on the fill level of the liquid in the liquid tank. Thus, the liquid forms a free liquid surface in the measurement channel, the position of which free liquid surface provides a measure for the fill level. By providing a measurement channel the fill level measurement can be carried out in an advantageous manner within the measurement channel in order to protect the measurement set-up, to avoid waves interfering with the measurement even in case of strong movements, and to be able to measure the fill level also during a filling operation in which foam generation or frothing can occur depending on the liquid.

The device further comprises a light emitting means that is arranged in such a manner that light emitted by the light emitting means can be passed or guided into the measurement channel. In this regard, in the context of the present invention light is not to be understood to refer to visible light only, but to any kind of visible or invisible electromagnetic radiation with which the mentioned measurement principles can be realized. The light emitting means is further arranged in such a manner that light passed or guided into the measurement channel can pass through it in the longitudinal direction. In this regard it is not necessary that the light travels exactly parallel to the longitudinal axis of the measurement channel. Rather, it is only necessary that the light travels along at least a part of the length of the measurement channel in such a manner that the light or a portion of the light passes at least partly through the liquid column present in operation within the measurement channel. Independent of whether the radiation passes in use through the entire liquid column or only through a part of its length it is necessary that the length of the longitudinal portion of the liquid column through which the radiation passes is characteristic of the length of the liquid column in the desired measurement range. The light passed or guided into the measurement channel by the light emitting means may be a light beam or a parallel or divergent pencil of light rays. In this regard, there is, of course, also the possibility that the light enters the measurement channel from a side and is deflected within the measurement channel into the longitudinal direction thereof. The light emitting means is chosen such that it is able to generate light of a predetermined wavelength or from a predetermined wavelength range. In this regard, this wavelength range may not only contain a continuous spectrum, but may also be constituted by light of several discrete or essentially discrete wavelengths. Therefore, in the context of the present invention it is also possible to utilize monochromatic light. In the case of use of several discrete or essentially discrete wavelengths it is possible that all discrete wavelengths are present in the light simultaneously or that selectively one or more wavelengths are present in the light switchably and separated in time.

Disclosed herein is a detector arrangement that is disposed in such a manner that light emitted by the light emitting means into the measurement channel is incident on the detector arrangement after having passed through at least a part of the liquid column. In this regard, the dimension of this part of the liquid column in the longitudinal direction of the measurement channel must, of course, be characteristic of the longitudinal dimension of the liquid column in the desired measurement range. The wall of the measurement channel, i.e. the surface defining the interior of the measurement channel, is constructed in such a manner that the reflection coefficient for light of the predetermined wavelength or from the predetermined wavelength range is at least 70% for arbitrary angles of incidence or at least for angles of incidence up to a predefined critical or limit angle. In the context of the present invention the reflection coefficient is defined as the percentage of the reflected intensity determined with respect to the incident intensity.

Light refracted and deflected at the liquid surface is conducted by the reflecting wall along the measurement channel to the detector arrangement and can be incident on it also in case of large deviations of the orientation of the liquid tank from the horizontal orientation. In this manner the loss of power due to refraction or due to the use of pencils of light rays of great aperture angle is decreased considerably or avoided. This is useful if a measurement light pencil that is as narrow as possible, and in the ideal case a parallel pencil of light rays, is used. It becomes possible in this manner to utilize weaker and, therefore, more inexpensive light sources as well as to increase the dynamic range and the measurement accuracy.

According to various embodiments the wall is constructed in such a manner that the reflection coefficient is at least 80%, or at least 90%, or at least 95%, or at least 99%. Overall, the reflection coefficient should be as close to 100% as possible and should ideally be 100%. A greater reflection coefficient has the advantage that the loss of power is further decreased.

In an embodiment the wall is formed from gold, silver, stainless steel or aluminum. In this regard, the entire body, in which the measurement channel is formed, or only a portion of this body immediately adjacent to the interior of the measurement channel may consist of these materials. It is, for example, possible that only a coating of these materials is provided that is defining the interior of the measurement channel. By means of such a construction and selection of materials the reflection coefficient is essentially independent of the angle of incidence. However, care has to be taken that, taking into consideration the type of liquid, the selected material is resistant to the environmental conditions within the liquid tank. For example, this has to be taken into account in particular in connection with the fill level measurement in fuel storage containers. Furthermore, for the measurement method of differential absorption the selected material has to exhibit the same reflection factor or a reflection factor as similar as possible for the individual measurement wavelengths used, because otherwise measurement errors result.

In an embodiment the wall is formed from a material that has at room temperature and a wavelength of 589 nm a refractive index of less than 1.33. This embodiment is suitable for fill level measurement of water and all liquids that have a greater refractive index than water. In connection with this application the refractive index of a medium is defined in the usual manner as ratio of the propagation velocity of electromagnetic radiation within the medium to the propagation velocity in vacuum at a particular wavelength. A suitable material is amorphous fluoropolymer and in particular an amorphous fluoropolymer known as Teflon AF that is described in the U.S. Pat. No. 4,754,009 and has a refractive index of 1.29. By means of the selection of such a material that has a refractive index that is smaller than the refractive index of water, total reflection can take place at the interface between the wall of the measurement channel and the liquid. In this case the tolerable deviation of the orientation of the liquid tank from the horizontal orientation is only limited by the critical angle of the total reflection. In this regard, it is again possible that the entire body, in which the measurement channel is formed, or only a part of this body immediately adjacent to the interior of the measurement channel consists of this material. Thus, it is again possible that only a coating of this material is provided that defines the interior of the measurement channel.

In an embodiment, that is specifically suitable for the determination of the fill level of jet fuel in a jet fuel tank and for the determination of the fill level of gasoline or diesel in a fuel tank, the wall is formed from a material that has a refractive index of less than 1.39 at room temperature and a wavelength of 589 nm. This embodiment is intended for the determination of the fill level of a liquid that has at room temperature and a wavelength of 589 nm a refractive index of at least 1.39. Such liquids include jet fuel with a refractive index in the range of about 1.43 to 1.47. At high temperatures the refractive index of the jet fuel can decrease down to 1.39. Therefore, with this embodiment it is also possible to determine the fill level of jet fuel at high temperatures significantly above room temperature. The refractive indices of jet fuel and diesel lie in the same range. A suitable material, that also has a higher resistance to jet fuel, is polytetrafluoroethylene, also known as Teflon, that has a refractive index of about 1.38. Further materials are fluorinated ethylene-propylene-copolymer, also known as Teflon FEP, with a refractive index of 1.341 to 1.347 and the mentioned Teflon AF. By means of the selection of such a material, that has a refractive index that is smaller than 1.39, total reflection can occur at the interface between the wall of the measurement channel and the respective liquids, which brings about the advantages mentioned above.

In an embodiment the light emitting means and the detector arrangement are arranged in such a manner and the measurement channel is constructed in such a manner that the light emitted in operation by the light emitting means into the measurement channel enters the measurement channel close to one end of the measurement channel and exits from the measurement channel close to the opposite end of the measurement channel in order to be incident on the detector arrangement. With such an arrangement the light passes through the liquid column or a part thereof once. In an alternative preferred embodiment the light emitting means and the detector arrangement are arranged in such a manner and the measurement channel is constructed in such a manner that the light emitted in operation by the light emitting means into the measurement channel enters the measurement channel close to one end of the measurement channel and exits again from the measurement channel close to the same end of the measurement channel in order to be incident on the detector arrangement. For the light deflection, that is required in this case, a suitably arranged reflector element is provided within the measurement channel or outside the measurement channel. With such an arrangement the light passes through the liquid column or a part thereof twice. In this regard, it is particularly preferred if the reflector element is designed such that the light beams incident thereon are reflected essentially independent of their angle of incidence onto themselves or only with a small lateral offset in order to avoid a disadvantageous lateral offset of the light beams. For this purpose reflector elements can be utilized that comprise a cat's-eye reflector. Cat's-eye reflectors particularly advantageous in this connection are phase conjugate mirrors or, preferably, micro-prism arrays. Suit-able micro-prism arrays with dimensions of the individual prism elements in the range of 0.2 mm are available from 3M, Reflexite or Avery-Dennison.

In an embodiment, the light emitting means is disposed remote from the measurement channel and that an optical waveguide or fiber-optic light guide for coupling light of the light emitting means into the measurement channel is disposed between the light emitting means and the measurement channel. In an embodiment the detector arrangement is disposed remote from the measurement channel and an optical waveguide or fiber-optic light guide for guiding light exiting from the measurement channel to the detector arrangement is disposed between the detector arrangement and the measurement channel. By using optical waveguides a high flexibility of the arrangement is achieved, and the use within an explosion-hazardous area can be allowed for in an optimal manner. Driving and output of measured values is possible via a few optical waveguides or fiber-optic light guides. In an embodiment where an optical waveguide or fiber-optic light guide is utilized for both coupling in and coupling out, the optical waveguide or fiber-optic light guide for guiding light exiting from the measurement channel to the detector arrangement is disposed between the light emitting means and the measurement channel in such a manner that by means of it is also possible to couple light of the light emitting means into the measurement channel. In other words only a single optical waveguide or fiber-optic light guide is utilized for both purposes. In this regard, if the light path for different wavelengths contained in the pencil of light rays is identical, then if applicable, intensity changing influences have to be taken into account only if they have different effects on the selected wavelengths. These optical waveguides or fiber-optic light guides play a part in guiding light towards and away from the liquid column to be measured. In this manner a particularly simple and flexible arrangement can be realized.

With a material selection by means of which total reflection in the region of the liquid column is realized it is necessary that the light emitting means is arranged in such a manner that light coupled by it in operation into the measurement channel enters the liquid column through the free surface of the liquid column, i.e. if the measurement light pencil enters the fuel from above.

In an embodiment the measurement channel is formed in a tubular liquid stilling body (a baffle that diminishes the movement of the liquid) that can be disposed within a liquid tank. In this regard, it is useful if the device is designed as immersion probe with a housing or casing that comprises the measurement channel. In this manner the device can be introduced as a unit from one side into a liquid tank without the need for providing several accesses to the liquid tank. Thereby, the modifications to existing liquid tanks required for the use of the device are kept within a limit.

In an embodiment the measurement channel is formed in the wall of a liquid tank, i.e. it is an integral part of the liquid storage container.

In various embodiments, the predetermined wavelength range comprises wavelengths from 700 nm to 1000 nm. In this regard, in particular such wavelengths are suitable at which the liquid to be measured comprises a characteristic absorption spectrum. For example, wavelengths of 850 nm and 904 nm are particularly suitable for measuring jet fuel. Furthermore, various embodiments use wavelengths at which cost efficient laser diodes are available as sources.

A device embodiment further comprises a means for generating a signal that is characteristic of the inclination of the liquid tank with respect to the free surface of the liquid in the liquid tank and, thus, of the deviation of the orientation of the liquid tank from the horizontal orientation, and an evaluation unit that is adapted for receiving the signal and for calculating from it and from a signal provided by the detector arrangement the fill level. By means of the knowledge of the inclination angle, that depends, for example, on the flight attitude, a conclusion can be made with respect to the actual fill level based on the optical path in liquid that possibly extended due to the refraction.

A device for the continuous optical determination of the fill level of a predetermined liquid in a liquid tank of a vehicle or airplane can be constructed or produced in the following manner. At first, an elongate measurement channel is provided, that can be arranged on or within a liquid tank in such a manner that liquid located within the liquid tank can enter the measurement channel and form a liquid column within the measurement channel, the dimension of which liquid column in the longitudinal direction of the measurement channel depends on the fill level of the liquid within the liquid tank. Further, a light emitting means is provided that is able to generate light of a predetermined wavelength or from a predetermined wavelength range. This light emitting means is arranged in such a manner that emitted light can be guided into the measurement channel and pass through it in the longitudinal direction in such a manner that the light passes at least partly through the liquid column that is present in operation within the measurement channel. Finally, a detector arrangement is provided and arranged in such a manner that light emitted by the light emitting means into the measurement channel is incident onto the detector arrangement after passing through at least a part of the liquid column.

The wall of the measurement channel is constructed such that, in operation, in the region of the liquid column the reflection coefficient at the wall for light of the predetermined wavelength or from the predetermined wavelength range is, at least for angles of incidence up to a predetermined critical or limit angle, at least 70%, or at least 80%, or at least 90%, or at least 95%, and or at least 99%.

Some embodiments use a material for the wall that has a smaller refractive index than the predetermined liquid at the predetermined wavelength or in the predetermined wavelength range. In this case total reflection can take place at the interface between the predetermined liquid and the measurement channel wall. In other words, the material of the wall of the measurement channel is adapted to the liquid to be measured in such a manner that total reflection is possible. In this regard, not only the type of the liquid, but also the intended temperature range, in which the measurement is to take place, as well as the wavelengths used for the measurement have to be taken into consideration.

Methods for the continuous optical determination of the fill level of a liquid in a liquid tank of a vehicle or airplane can be carried out, which methods are independent of the orientation of the liquid tank in a wide range. In such a method a light pulse is emitted by means of the light emitting means, and the propagation time of the light pulse between the light emitting means and the detector arrangement is measured. For this purpose, the device comprises a clock that is located in the detector arrangement or in a separate evaluation means, such as, for example, the evaluation unit described above. Finally the fill level is determined on the basis of the measured propagation time. In an embodiment of a method for the continuous optical determination of the fill level of a liquid in a liquid tank of a vehicle or airplane, light of at least two different wavelengths is emitted by means of the light emitting means, and with the detector arrangement the intensity incident thereon is measured for each of the wavelengths. Then, the ratio of the intensity emitted by the light emitting means to the intensity measured at the detector arrangement is determined for each of the wavelengths, and the fill level is calculated on the basis of the determined intensity ratio. This method corresponds to the differential absorption. For this purpose, the device according to the invention can comprise a light source, that emits the wavelengths timely separated, for example monochromatically, or a broadband light source, the emission spectrum of which comprises the individual wavelengths. For the separate measurement of the intensities at the detector arrangement the detector arrangement comprises in the latter case a means for spectrally separating the incident light and preferably operates spatially selectively.

Figure 2:
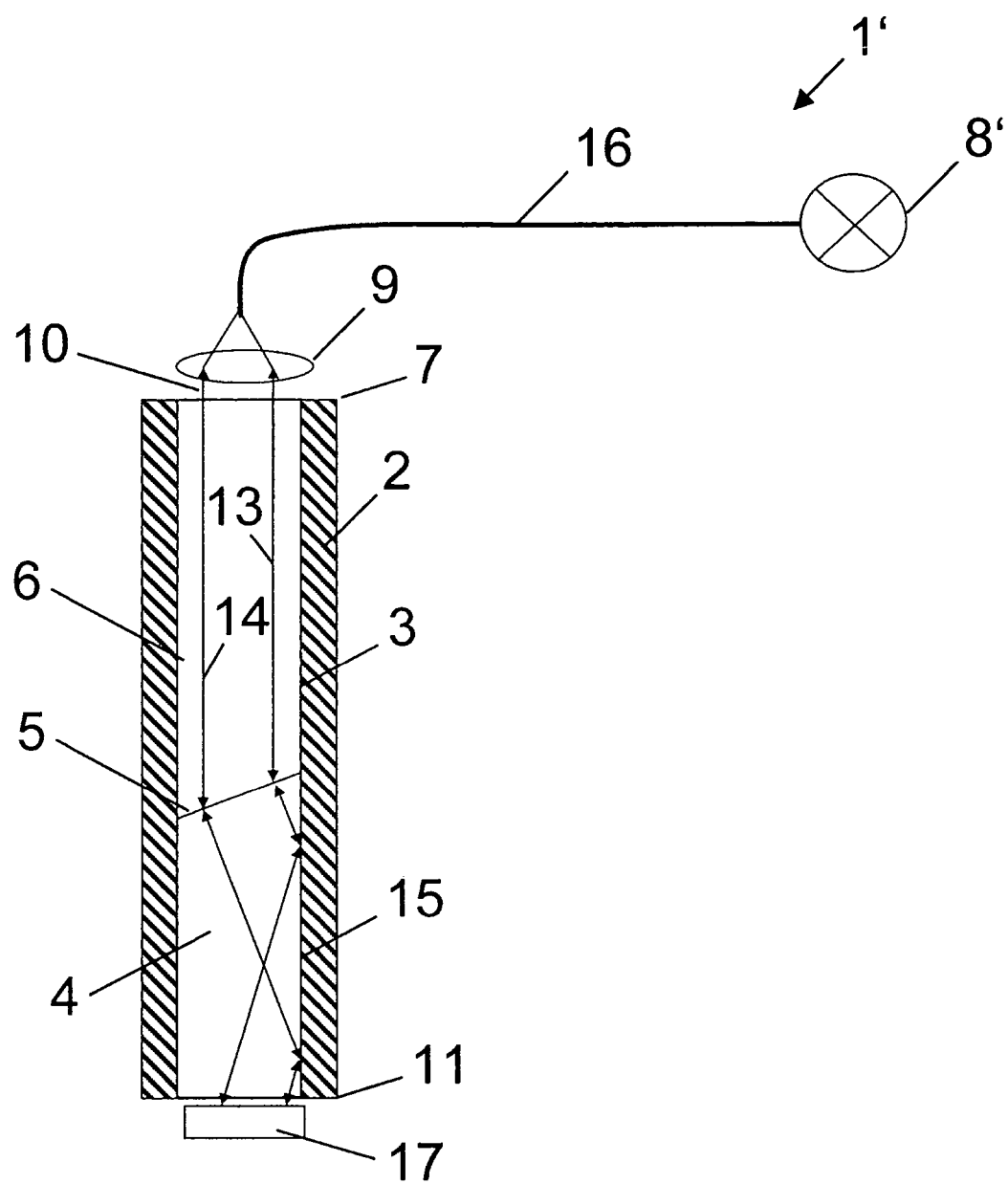

In the following an embodiment of the invention is explained in more detail on the basis of a with reference to the drawings, in which FIG. 1 shows schematically the construction of a device according to the invention for the determination of the fill level of fuel, and FIG. 2 shows schematically the construction of a further embodiment of a device according to the invention for the determination of the fill level of fuel.

The device 1 shown in FIG. 1 is arranged on a jet fuel tank or storage container, not shown, of an airplane, which jet fuel tank or storage container contains the fuel to be measured. The device 1 comprises a tube or pipe 2 disposed within the jet fuel tank. It is constructed in such a manner that jet fuel from the jet fuel tank can rise within the tube 2 up to a height that depends on the fill level of the jet fuel in the jet fuel tank. This can be realized, for example, by providing that the tube 2 is open at the bottom, so that jet fuel can enter the tube from below. The interior of the tube 2 forms a measurement channel 3 in which the actual measurement is taking place.

Due to the described construction a column 4 of the liquid jet fuel forms within the measurement channel 3. The liquid column 4 comprises a free surface 5 that forms at the same time an interface between the jet fuel 4 and the gaseous atmosphere 6 present above the jet fuel. The position of the surface 5 in the longitudinal direction of the measurement channel 3 is a measure for the fill level of the jet fuel in the jet fuel tank.

Near the upper end 7 of the tube 2 a light source 8 and a collimating optics 9 are arranged in such a manner that a parallel pencil of light rays 10 is generated and is emitted into the measurement channel 3 parallel to the longitudinal axis of the tube 2 and the measurement channel 3 and travels towards the free liquid surface 5. Near the bottom end 11 of the tube 2 a detector 12 is disposed that generates upon the incidence of light on the detector 12 a signal characteristic of its intensity. In case the device 1 is intended for the measurement method of differential absorption described above, the light source 8 is constructed such that it can generate light of at least two different wavelengths. In this regard, a separation of the wavelengths is possible both on the source side by time methods and on the detector side by spectral-spatial methods.

It is evident that in the case of a liquid surface 5 perpendicular to the longitudinal axis of the measurement channel 3, i.e. in the case of no inclination of the jet fuel tank, the parallel pencil of light rays 10 would enter the jet fuel column 4 without deflection, and thus the entire light of the pencil of light rays 10, that is not absorbed within the jet fuel column 4, would be incident on the detector. In the depicted example, however, there is an inclination of the jet fuel tank, so that the liquid surface 5 is not oriented perpendicularly to the longitudinal axis of the measurement channel 3. Therefore, the individual light rays 13, 14 of the parallel pencil of light rays 10 are refracted at the interface 5 and deflected towards the interior wall 15 of the tube 2 defining the measurement channel 3. In principle this would have the result that the light rays 13, 14 are no longer incident on the detector 12 and the fill level measurement becomes impossible. In the shown embodiment the tube 2 is, however, formed from a material that has at the wavelengths used for the measurement a smaller refractive index than the jet fuel 4. In particular, the tube 2 is, for example, formed from Teflon PTFE, Teflon FEP or Teflon AF. Teflon PTFE has a refractive index of 1.38 at 589 nm, and Teflon FEP and Teflon AF have even smaller refractive indices. These refractive indices are smaller than the refractive index of jet fuel. Therefore, total reflection is taking place at the interface between the jet fuel 4 and the tube 2, as long as the critical angle of the total reflection is not exceeded. In this manner, the light rays 13, 14 can be incident on the detector 12 in spite of the deflection at the jet fuel surface 5 also at relatively large inclination angles. The light of the light source 8 is utilized in an optimal manner.

FIG. 2 shows a further embodiment 1' of a device in accordance with the invention. In FIG. 2 identical components are designated by identical reference numerals, and modified components are designated by the addition of a dash to the reference numeral. The device 1' depicted in FIG. 2 differs from the device 1 on the one hand in that the light source 8' is arranged remote from the tube 2 and the collimating optics 9. For guiding the light emitted by the light source to the collimating optics 9 and into the measurement channel 3 a fiber-optic light guide 16 is provided.

The device 1' depicted in FIG. 2 differs from the device 1 further in that no detector is disposed at the end 11 opposite the end 7 at which coupling of light into the measurement channel is effected, but a reflector element 17 in the form of a micro-prism array. This reflector element 17 reflects the light rays 13, 14 incident on the reflector element 17 back into themselves. Thus, they again pass up within the measurement channel 3 and are coupled into the fiber-optic light guide 16 via the collimating optics 9. For the measurement of the light that has passed through the jet fuel column 4 the light source 8' is designed as combined light source and detector arrangement.

It is evident from FIGS. 1 and 2 that the length of the optical path within the jet fuel column does not only depend on the dimension in the longitudinal direction of the measurement channel 3, but also on the angular orientation of the liquid surface 5 with respect to the tube 2 and the incident light rays 13, 14, respectively. In order to be able to calculated the actual fill level, it is therefore necessary to also determine the inclination independently. For example, in airplanes, that comprise respective flight attitude sensors, this information is already available. In vehicles, that innately do not include such means, the device according to the invention should comprise a suitable means for the determination of the inclination.

The invention claimed is:

1. A device for the continuous optical determination of the fill level of liquids in liquid tanks of vehicles or airplanes, wherein the liquids have at room temperature and a wavelength of 589 nm a refractive index of at least 1.33, comprising:
    an elongate measurement channel, that can be arranged on or in a liquid tank in such a manner that liquid located in the tank can enter the measurement channel and form a liquid column within the measurement channel, the dimension of which liquid column in the longitudinal direction of the measurement channel depends on the fill level of the liquid within the liquid tank,
    a light emitting means that is arranged such that light emitted by the light emitting means can be guided into the measurement channel and pass through it in the longitudinal direction in such a manner that the light passes at least partly through the liquid column located in operation within the measurement channel, and wherein the light emitting means can generate light of a predetermined wavelength or from a predetermined wavelength range, and
    a detector arrangement that is arranged such that light emitted by the light emitting means into the measurement channel is incident on the detector arrangement after passing through at least a part of the liquid column,
    wherein the wall of the measurement channel is constructed such that, in operation, the reflection coefficient at the wall in the region of the liquid column for light of the predetermined wavelength or from the predetermined wavelength range is at least 70%, at least for angles of incidence up to a predetermined critical angle.

2. The device according to claim 1, wherein the wall is constructed such that the reflection coefficient is at least 80%.

3. The device according to claim 2, wherein the wall is constructed such that the reflection coefficient is at least 90%.

4. The device according to claim 3, wherein the wall is constructed such that the reflection coefficient is at least 95%.

5. The device according to claim 4, wherein the wall is constructed such that the reflection coefficient is at least 99%.

6. The device according to claim 1, wherein the wall is formed from gold, silver, stainless steel or aluminum.

7. The device according to claim 1, wherein the wall is formed from a material that has at room temperature and a wavelength of 589 nm a refractive index of less than 1.33.

8. The device according to claim 7, wherein the material is amorphous fluoropolymer.

9. The device according to claim 1, which is intended for the determination of the fill level of a liquid, that has at room temperature and a wavelength of 589 nm a refractive index of at least 1.39, and in which the wall is formed from a material that has at room temperature and a wavelength of 589 nm a refractive index of less than 1.39.

10. The device according to claim 9, wherein the material is polytetrafluoroethylene.

11. The device according to claim 9, wherein the material is fluorinated ethylene-propylene-copolymer.

12. The device according to claim 1, wherein the light emitting means and the detector arrangement are arranged in such a manner and the measurement channel is constructed in such a manner that the light, emitted in operation by the light emitting means into the measurement channel, enters the measurement channel near one end of the measurement channel and exits the measurement channel near the opposite end of the measurement channel, in order to be incident on the detector arrangement.

13. The device according to claim 1, wherein the light emitting means and the detector arrangement are arranged in such a manner and the measurement channel is constructed in such a manner that the light, emitted in operation by the light emitting means into the measurement channel, enters the measurement channel near one end of the measurement channel and exits the measurement channel near the same end of the measurement channel, in order to be incident on the detector arrangement, wherein a suitably arranged reflector element is provided for the light deflection required therefore.

14. The device according to claim 13, wherein the reflector element comprises a cat's-eye reflector.

15. The device according to claim 14, wherein the cat's-eye reflector is a phase conjugate mirror or a micro-prism array.

16. The device according to claim 1, wherein the light emitting means is disposed remote from the measurement channel, and wherein a light guide for coupling light of the light emitting means into the measurement channel is disposed between the light emitting means and the measurement channel.

17. The device according to claim 1, wherein the detector arrangement is disposed remote from the measurement channel, and wherein a light guide for guiding light exiting the measurement channel to the detector arrangement is disposed between the detector arrangement and the measurement channel.

18. The device according to claim 17, wherein the light guide for guiding light exiting the measurement channel to the detector arrangement is disposed between the light emitting means and the measurement channel in such a manner that by means of it it is also possible to couple light of the light emitting means into the measurement channel.

19. The device according to claim 1, wherein the light emitting means is arranged in such a manner that light coupled by it in operation into the measurement channel enters the liquid column through the free surface of the liquid column.

20. The device according to claim 1, wherein the measurement channel is formed in a tubular liquid stilling body, that can be arranged within the liquid tank.

21. The device according to claim 1, that is constructed as immersion probe with a housing that comprises the measurement channel.

22. The device according to claim 1, wherein the measurement channel is formed in the wall of a liquid tank.

23. The device according to claim 1, wherein the predetermined wavelength range comprises wavelengths from 700 nm to 1000 nm.

24. The device according to claim 1, that further comprises a means for generating a signal that is characteristic of the inclination of the liquid tank with respect to the free surface of the liquid, and an evaluation unit that is adapted to receive the signal and to calculate from it and from a signal provided by the detector arrangement the fill level.

25. A method for constructing a device for the continuous optical determination of the fill level of a predetermined liquid in a liquid tank of a vehicle or airplane, the method comprising:
   providing an elongate measurement channel that can be arranged on or in a liquid tank in such a manner that liquid located in the tank can enter the measurement channel and form a liquid column within the measurement channel, the dimension of which liquid column in the longitudinal direction of the measurement channel depends on the fill level of the liquid within the liquid tank,
   providing a light emitting means that is able to generate light of a predetermined wavelength or from a predetermined wavelength range, and arranging the light emitting means in such a manner that emitted light can be guided into the measurement channel and can pass through it in the longitudinal direction in such a manner that the light passes at least partly through the liquid column located in operation within the measurement channel,
   providing a detector arrangement and arranging the detector arrangement such that light emitted by the light emitting means into the measurement channel is incident on the detector arrangement after passing through at least a part of the liquid column,
   wherein the wall of the measurement channel is constructed such that, in operation, the reflection coefficient at the wall in the region of the liquid column for light of the predetermined wavelength or from the predetermined wavelength range is at least 70%, at least for angles of incidence up to a predetermined critical angle.

26. The method according to claim 25, wherein a material is chosen for the wall that has at the predetermined wavelength or in the predetermined wavelength range a smaller refractive index than the predetermined liquid.

27. A method for the continuous optical determination of the fill level of a liquid in a liquid tank of a vehicle or airplane, the method comprising:
   providing a device according to claim 1,
   emitting a light pulse by means of the light emitting means,
   measuring the propagation time of the light pulse between the light emitting means and the detector arrangement, and
   determining the fill level on the basis of the measured propagation time.

28. A method for the continuous optical determination of the fill level of a liquid in a liquid tank of a vehicle or airplane, the method for comprising:
   providing a device according to claim 1,
   emitting light with at least two different wavelengths by means of the light emitting means,
   measuring the intensity incident on the detector arrangement for each of the wavelengths,
   determining the ratio of the intensity emitted by the light emitting means to the intensity measured at the detector arrangement for each of the wavelengths, and
   determining the fill level on the basis of the measured intensity ratios.

* * * * *